United States Patent
Herbst et al.

(10) Patent No.: US 10,588,323 B2
(45) Date of Patent: Mar. 17, 2020

(54) FISH-SUPPLYING DEVICE AND METHOD THEREFOR

(71) Applicant: NORDISCHER MASCHINENBAU RUD. BAADER GMBH + CO. KG, Luebeck (DE)

(72) Inventors: Jan-Patrick Herbst, Gross Roennau (DE); Frank Schubert, Hamburg (DE); Ulf Jacobsen, Bad Schwartau (DE); Christian Lohse, Hamburg (DE); Ib Verner Dalgaard-Nielsen, Hoerning (DK)

(73) Assignee: NORDISCHER MASCHINENBAU RUD. BAADER GMBH + CO. KG, Luebeck (DE)

( * ) Notice: Subject to any disclaimer, the term of this patent is extended or adjusted under 35 U.S.C. 154(b) by 0 days.

(21) Appl. No.: 16/096,090

(22) PCT Filed: Apr. 26, 2016

(86) PCT No.: PCT/EP2016/059304
§ 371 (c)(1),
(2) Date: Oct. 24, 2018

(87) PCT Pub. No.: WO2017/186274
PCT Pub. Date: Nov. 2, 2017

(65) Prior Publication Data
US 2019/0116817 A1 Apr. 25, 2019

(51) Int. Cl.
*A22C 25/00* (2006.01)
*A22C 25/08* (2006.01)
*A22C 25/12* (2006.01)

(52) U.S. Cl.
CPC .............. *A22C 25/08* (2013.01); *A22C 25/12* (2013.01)

(58) Field of Classification Search
CPC ......... A22C 25/00; A22C 25/08; A22C 25/12; A22C 25/14; A22C 25/142; A22C 25/18
(Continued)

(56) References Cited

U.S. PATENT DOCUMENTS 1,649,304 A * 11/1927 Gray ...................... A22C 25/12
193/46
4,601,083 A * 7/1986 Shoji ...................... A22C 25/12
452/157

(Continued)

FOREIGN PATENT DOCUMENTS

WO 03/013262 2/2003
WO 2016/020105 2/2016

OTHER PUBLICATIONS

PCT Search Report and Written Opinion issued in PCT/EP2016/059304.
(Continued)

*Primary Examiner* — Richard T Price, Jr.
(74) *Attorney, Agent, or Firm* — Greenblum & Bernstein, P.L.C.

(57) ABSTRACT

The present invention concerns a fish feed-in device (10) which is designed to supply fish (13) to a plurality of fish-processing devices and comprises a transverse conveyor (14) designed to convey the fish (13) transversely to their head-tail orientation in a transverse conveying direction (15), wherein the transverse conveyor (14) comprises a plurality of receptacles (17) each designed to individually hold one of the fish (13), and the transverse conveyor (14) has a controllable drive unit (19), at least one feeder device (11) designed to supply fish to the receptacles (17) of the transverse conveyor (14), a plurality of transfer devices (16) which are designed to selectively transfer the fish (13) from the transverse conveyor to longitudinal conveyors (12) arranged upstream of the respective fish-processing devices, (Continued)

wherein the longitudinal conveyors (12) are designed to convey the fish (13) in their head-tail orientation to the fish-processing machines, and a control device which is designed to control the at least one feeder device (11), the transfer devices (16), and the conveying speed of the transverse conveyor (14) on the basis of at least one predefined distribution specification. The invention furthermore concerns a corresponding method for supplying fish.

35 Claims, 7 Drawing Sheets

(58) Field of Classification Search
USPC ........ 452/119, 125, 127, 149, 160–163, 177, 452/179, 182–184
See application file for complete search history.

(56) References Cited

U.S. PATENT DOCUMENTS

| | | | | |
|---|---|---|---|---|
| 4,955,110 | A * | 9/1990 | Ogawa | A22C 25/14 452/110 |
| 5,184,973 | A * | 2/1993 | Orlando | A22C 25/17 452/125 |
| 5,258,441 | A * | 11/1993 | Nagahiro | C08L 79/08 524/425 |
| 6,843,169 | B2 * | 1/2005 | Nielsen | A22C 21/0053 452/156 |
| 7,056,202 | B2 * | 6/2006 | Pein | A22C 25/145 452/161 |
| 7,252,584 | B2 * | 8/2007 | Kragh | A22C 25/08 452/163 |
| 7,637,805 | B1 * | 12/2009 | Bueide | A22C 25/12 452/179 |
| 8,092,283 | B2 * | 1/2012 | Hansen | A22C 25/08 452/121 |
| 8,512,106 | B2 * | 8/2013 | Ryan | A22C 25/147 452/121 |
| 2005/0009463 | A1 | 1/2005 | Crosseholz | |
| 2017/0231239 | A1 | 8/2017 | Jacobsen | |
| 2018/0160692 | A1 | 6/2018 | Paulsohn | |
| 2019/0133141 | A1 | 5/2019 | Schubert | |
| 2019/0133142 | A1 | 5/2019 | Hensel | |
| 2019/0136942 | A1 | 5/2019 | Dalgaard-Nielsen | |

OTHER PUBLICATIONS

IBtrade foodmachines video link, Jan. 2015.
Marel Fish video link, Dec. 2016.
Office Action issued in Chilean Application No. 2018003033.

* cited by examiner

FISH-SUPPLYING DEVICE AND METHOD THEREFOR

CROSS-REFERENCE TO RELATED APPLICATIONS

The present application is a U.S. National Stage of International Patent Application No. PCT/EP2016/059304 filed Apr. 26, 2016.

BACKGROUND OF THE INVENTION

1. Field of the Invention

The present invention concerns a fish feed-in device which is configured and designed to supply fish to several fish-processing devices. The invention furthermore concerns a method for supplying fish to several fish-processing machines.

2. Background Information

Such arrangements and methods are used in the fish-processing industry. In particular, on automatic processing of fish, it is necessary to supply the fish to the respective fish-processing devices automatically.

Document WO 03/013262 describes for example a method for automated processing of fish, and a plant for preparation and processing of fish. The fish are supplied to processing machines, in particular machines for automatic gutting, automatically in a controlled fashion via corresponding infeed devices. The infeed device used is a supply conveyor on which the fish are conveyed in the fish longitudinal direction. By way of controllable deflectors, the fish are supplied to the respective processing machines in that the fish are each pushed by the deflector from the conveyor onto a chute which leads to the respective processing machine.

The known apparatuses and methods for supplying fish have a number of disadvantages. Firstly, when fish are conveyed in the longitudinal orientation, i.e. head or tail first, as known from the prior art, the maximum number of fish which can be conveyed per time unit has an upper limit. The fish are usually conveyed in the longitudinal direction by way of conveyor belts on which the fish are transported while lying flat. To avoid uncontrolled slipping of the fish on infeed onto such conveyor belts, there is an upper limit to the maximum conveying speed. A further disadvantage is that each fish on the conveyor belt occupies a portion in the conveying direction which corresponds at least to its body length, thereby also limiting the maximum conveying speed.

A further disadvantage is that with today's desired high throughput rates of fish per time unit, it is no longer possible for operators to lay the fish manually on such a conveyor belt and achieve the desired conveying speeds.

There is furthermore the need to supply the fish at a central location of the plant for further fish-processing, and distribute these automatically to several fish-processing devices with as high a throughput rate as possible.

SUMMARY OF THE INVENTION

It is therefore an object of the present invention to propose a fish feed-in apparatus which guarantees an optimal supply of fish to several processing devices with simultaneously as high a conveying speed is possible. The object furthermore comprises the proposal of a corresponding method.

The object is achieved by the fish feed-in device cited hereinbefore, wherein this comprises a transverse conveyor which is designed to convey the fish transversely to their head-tail orientation in a transverse conveying direction, wherein the transverse conveyor comprises a plurality of receptacles each configured to individually hold one of the fish, and the transverse conveyor also comprises a controllable drive unit, and the fish feed-in device furthermore comprises at least one feeder device configured to supply fish to the receptacles of the transverse conveyor, and a plurality of transfer devices which are configured to selectively transfer the fish from the transverse conveyor to the respective longitudinal conveyor arranged upstream of the respective fish-processing device, wherein the longitudinal conveyors are designed to convey the fish in their head-tail orientation to the fish-processing machines, and a control device, which is designed to control the at least one feeder device, the transfer devices, and the conveying speed of the transverse conveyor on the basis of at least one predefined distribution specification. In this way, it is possible to distribute the fish optimally to several fish-processing devices with high conveying speeds. Firstly, the transverse conveyor offers the advantage that the fish are densely packed and hence a large number of fish can be conveyed per length portion. Secondly, the transverse conveyor allows correspondingly high conveying speeds since the fish are held individually and securely centred by way of the receptacles, and also the space required in the conveying direction is substantially restricted to the width of the fish.

A further advantage is that the infeed of fish to the receptacles by way of the feeder devices is substantially automated. The feeder devices are therefore designed and configured for precise, automatic infeed to the receptacles so that even at high conveying speeds of the transverse conveyor, a precise infeed to the receptacles is guaranteed at all times.

Because of the control of the at least one infeed device, the transfer device and the conveying speed of the transverse conveyor by way of the specifically configured control device, the infeed of fish to the further fish-processing devices is optimised in all respects. By way of the predefined distribution specification, the total conveying rate of the transverse conveyor is predefined by the available take-up performance of the respective fish-processing devices. In the case of failure of one of the fish-processing devices or reduced performance thereof, by way of the control device on the basis of the predefined distribution specification, the respective transfer device is made to transfer fewer fish accordingly to the respective longitudinal conveyor. Insofar as intake capacity is available on other fish-processing devices, the fish which are not transferred to the failed fish-processing machines are transferred to another longitudinal conveyor by way of the transfer devices, and/or the conveying speed of the transverse conveyor is reduced accordingly.

It is particularly advantageous that by way of the fish feed-in device according to the invention and by way of the method according to the invention, the total plant comprising the fish feed-in device and the fish-processing devices has great flexibility with regard to its physical arrangement. Thus the distances between the individual fish-processing devices need not be equidistant, since the transfer of fish may be adapted to the circumstances by way of the predefined distribution specification.

A suitable embodiment of the invention is characterised in that the at least one feeder device comprises at least one clocking flap element which is movable under control and configured, by way of a clocking control signal generated by the control device, to control the infeed of fish to one of the receptacles at a preselected output time. In this way, each fish is transferred to the receptacle passing the clocking flap element at the correct time. Because the control device is designed and configured to control the clocking flap element, it is possible to supply the receptacles precisely and with correspondingly high conveying speeds of the transverse conveyor.

A further advantage is that, on failure of one of the fish-processing devices in dynamic operation, it is possible to refrain from supplying the receptacles from which the fish would, in normal operation, have been transferred to said machine by way of the correspondingly assigned transfer device. In this way, operation may be sustained without interruption even on failure of individual fish-processing machines, and a shutdown of the entire plant may be largely avoided.

A preferred development of the invention is distinguished in that the feeder device comprises a guide plane which is arranged inclined, such that under the effect of gravity, the fish automatically come to lie in a first retaining area in front of the clocking flap element when the latter is in a closed position, and automatically move in the direction of the transverse conveyor into the respective receptacle when said clocking flap element is in an open position. This guarantees that the fish are transferred to the receptacles in a controlled and cyclic fashion. The fish thus initially come to rest in the retaining area. From this rest position, the fish are then transferred by way of the clocking flap element to the respective receptacle.

According to a preferred embodiment of the invention, the feeder device comprises a storage flap element which is movable under control, wherein the storage flap element is arranged upstream of the clocking flap element so as to form a flap cascade. In other words, the feeder devices are each configured as a stepped cascade. This ensures on the one hand that no fish slips down the guide plane uncontrolledly, i.e. without first coming to rest if both the clocking flap element and the storage flap element are in the open position. On the other hand, this offers increased convenience for the operator who supplies the fish to the feeder device. Since it is ensured that the fish are briefly stopped by way of the above-mentioned flap cascade in order then to be transferred to the receptacles from this rest position, i.e. from defined starting conditions, the operator need merely ensure that a fish is placed in a region in front of the storage flap element in good time. The further infeed to the receptacles takes place, as described above, automatically by the control device and requires no further intervention by the operator.

A further suitable embodiment of the invention is characterised in that the control device is configured to control the flap cascade such that when the clocking flap element is moved from an open position to a closed position, the storage flap element is moved from a closed position to an open position, and vice versa. In this way, the infeed performance of the feeder device, i.e. the number of fish which can be supplied by the respective feeder device per time unit, is increased further. Thus the necessary times for moving the clocking flap element and storage flap element, and the inertia of the fish on acceleration on the guide plane under gravity, are taken into account by the control device so that for example the storage flap element releases a fish even before the clocking flap element has reached its closed position.

According to a preferred embodiment, a sensor for fish detection is arranged in the region of the storage flap element, and is designed and configured to detect the presence of a fish in a waiting area in front of the storage flap element and report this to the control device. By way of the sensor, the control device automatically detects when a fish is present in front of the storage flap. In particular, the control device is configured to conduct said fish directly where possible into the retaining area in front of the clocking flap element as soon the retaining area in front of the clocking flap element is free of fish.

A further suitable embodiment of the invention is characterised in that several of the feeder devices are arranged next to and offset to each other in the transverse conveying direction by at least a width of the receptacle. This offers the advantage of increasing the number of fish which can be transferred to the receptacles per time unit, and hence the total throughput performance of the supply device according to the invention. A further advantage is that because of the offset arrangement of the feeder devices, the receptacles may be supplied without interruption, i.e. the receptacles can be supplied without any of the receptacles remaining empty. In this way, the conveying capacity of the transverse conveyor is utilised to the optimum. The transverse conveyor is in particular configured and designed as a circulating conveyor.

A suitable embodiment of the invention is characterised in that each of the receptacles is configured so as to be pivotable about a transverse axis. The receptacles of the transverse conveyor are configured and designed so as to be pivotable, such that on delivery of the fish to the respective transfer devices, these can be tilted in order to transfer the fish to the respective longitudinal conveyor.

A preferred development of the invention is distinguished in that the transfer devices each comprise an ejecting diverter which is configured and designed to pivot the respective receptacle from a fish transport position into a fish ejection position by way of a transfer control signal generated by the control device. In the fish transport position, the receptacles are therefore preferably arranged horizontally and form a corresponding transport plane for conveying the individual fish lying in the receptacles in the conveying direction. In the fish ejection position, the receptacles are tilted so that the fish slide under the effect of gravity below the transport plane formed by the receptacles and are transferred to the respective longitudinal conveyor. Particularly preferably, the ejecting diverter comprises a pivot guide configured so as to be controllable by way of the transfer control signal.

A further suitable embodiment of the invention is characterised in that the transfer devices each comprise guiding device in the region of the ejecting diverter, which device is configured to transfer the fish from the receptacles in the fish ejection position to the respective longitudinal conveyor under the effect of gravity. The guiding device guarantee a controlled transfer of the fish to the respective longitudinal conveyor so that the fish are transferred in a targeted fashion without damage.

According to a further preferred embodiment, the transfer devices each comprise fish occupation sensors which are configured to report to the control device whether the respective longitudinal conveyor is occupied by a fish or is free in the region of the transfer device. The fish occupation sensors are configured to notify the control device of whether further fish may be transferred to the respective longitudinal conveyor at the respective transfer devices. If for example one of the fish-processing devices fails, the respective longitudinal conveyor may temporarily not accept further fish. This is reliably detected by way of the fish occupation sensors and taken into account by the control device on transfer of the fish by way of the transfer devices, on the basis of the predefined distribution specification.

A further suitable embodiment of the invention is characterised in that the control device is configured to assign the receptacles, when supplied with fish, to a respective fish-processing machine on the basis of the predefined distribution specification, and to determine an allocation specification. The predefined distribution specification comprises a preset distribution key, according to which the fish are assigned to the respective fish-processing devices. On the basis of this predefined distribution specification, the control device establishes the allocation specification which assigns each of the occupied receptacles to one of the longitudinal conveyors or a respective fish-processing device. In other words, each receptacle is initially assigned to one of the fish-processing devices. If, during dynamic operation, the take-up performance of the individual fish-processing devices changes, for example due to faults or other events relevant for the respective throughput rate, the control device is configured to adapt the distribution specification and/or allocation specification accordingly in order to continue to guarantee the optimal supply of fish to the respective fish-processing machines.

According to a further preferred embodiment, the control device is configured to determine the positions of the receptacles and determine the respective output times on the basis of the allocation specification and the determined positions of the receptacles. In other words, the control device is configured to monitor the position of the receptacles at all times.

A suitable embodiment of the invention is characterised in that the control device is configured to determine the respective take-up performance of the fish-processing machines and/or the occupation states of the transfer devices, and from this determine the actual take-up performance for each fish-processing device. This offers the advantage that the distribution and/or allocation specification is at all times adapted optimally depending on the actual take-up performance.

According to a further preferred embodiment, the control device comprises a comparison unit which is adapted to compare the actual take-up performance of each of the fish-processing devices with a predetermined nominal take-up performance assigned to the respective fish-processing device, and if at least one of the actual take-up performances falls below the respective assigned nominal take-up performance, to adapt the predefined distribution specification such that the respective nominal take-up performance is at least temporarily reduced. In this way, a reduced intake by individual fish-processing devices is detected by way of the control device, and the infeed of fish to the longitudinal conveyors is adapted accordingly.

A further suitable embodiment of the invention is characterised in that the control unit is furthermore configured to determine a total actual take-up performance as a sum of the actual take-up performances of the fish-processing machines, and control the conveying speed of the transverse conveyor such that the infeed to the receptacles is uninterrupted. The uninterrupted filling of the receptacles has a particularly advantageous effect that, after stoppage of the transverse conveyor and/or re-acceleration of the transverse conveyor to the original conveying speed, the receptacles are supplied without interruption so that the maximum supply performance is provided immediately.

The object is also achieved by the method cited hereinbefore, wherein the method comprises the following steps: conveying the fish transversely to their head-tail orientation in the transverse conveying direction by way of a plurality of receptacles of a transverse conveyor which are each formed to individually hold one of the fish, infeed to the receptacles of the transverse conveyor by way of a feeder device, selective transfer of the fish by way of transfer devices from the transverse conveyor to the respective longitudinal conveyors arranged upstream of the fish-processing machines, conveying of the transferred fish in their head-tail orientation to the fish-processing machines by way of the longitudinal conveyors, controlling the infeed to the receptacles and the selective transfer of the fish on the basis of at least one predefined distribution specification.

The advantages associated with the method according to the invention have already been explained above in connection with the fish feed-in device according to the invention. To avoid repetition, reference is made to the advantages described there which apply accordingly to the method according to the invention.

A suitable embodiment of the invention is distinguished by generation of a clocking control signal by way of the control device, and activation of at least one clocking flap element of the feeder device which is movable under control, and infeed of fish to the receptacles at a preselected output time.

A preferred development of the invention is distinguished in that, under the effect of gravity, the fish automatically come to lie in a first retaining area in front of the clocking flap element when the latter is in a closed position, and automatically move in the direction of the transverse conveyor into the respective receptacle when said clocking flap element is in an open position, in that the fish slide down an inclined guide plane.

According to a further preferred embodiment of the invention, on infeed to the receptacles, the fish pass under cyclic control through a flap cascade formed by the clocking flap element and a storage flap element which is arranged upstream thereof and is movable under control.

A further suitable embodiment of the invention is characterised in that the flap cascade is controlled by way of the control device such that when the clocking flap element is in the open position, the storage flap element is in a closed position, or when the storage flap element is in an open position, the clocking flap element is in the closed position.

According to a further preferred embodiment, the method according to the invention comprises detection, by way of a sensor, of whether a waiting area in front of the storage flap element is occupied by a fish or is free, and reporting of the detected state to the control device.

A further suitable embodiment of the invention is characterised by infeed to the receptacles by way of several feeder devices arranged next to and offset to each other in the transverse conveying direction by at least a width of the receptacles.

A further advantageous embodiment of the invention is characterised by generation of a transfer control signal by way of the control device, and actuation of a pivot movement of the receptacles from a fish transport position into a fish ejection position by way of a respective ejecting diverter for transfer of a fish from a receptacle to the respective longitudinal conveyor.

A suitable embodiment of the invention is characterised by guidance of the fish onto the respective longitudinal conveyor under the effect of gravity in the region of the ejecting diverter by way of guiding device.

A preferred development of the invention is characterised by detection of the occupation state of the transfer devices by way of fish occupation sensors, and reporting of whether the respective longitudinal conveyor is occupied by a fish or is free in the region of the transfer device, by transmission of the detected occupation state to the control device.

According to a further preferred embodiment of the invention, the transverse conveyor is driven by way of a controllable drive unit and the conveying speed is set by way of the control device.

A further suitable embodiment of the invention is characterised by allocation of the receptacles, on infeed of fish thereto, to one of the respective fish-processing machines on the basis of a predefined distribution specification, and production of an allocation specification.

A suitable embodiment of the invention is characterised by determination of the position of the receptacles and determination of the respective output times by way of the allocation specification and the determined positions of the receptacles.

According to a further preferred embodiment, the take-up performances of the fish-processing machines and/or the occupation states of the transfer devices are monitored and from this, the actual take-up performance for each fish-processing device is determined.

A further suitable embodiment of the invention is characterised by comparison of the actual take-up performance of each fish-processing device with a predetermined nominal take-up performance assigned to the respective fish-processing device, and if at least one of the actual take-up performances falls below the respective assigned nominal take-up performance, adaptation of the predetermined distribution specification such that the respective nominal take-up performance is at least temporarily reduced.

A further suitable embodiment of the invention is characterised by determination of a total actual take-up performance as a sum of the actual take-up performances of the fish-processing machines, and control of the conveying speed of the transverse conveyor such that the infeed to the receptacles is uninterrupted.

BRIEF DESCRIPTION OF THE DRAWINGS

Further preferred and/or suitable features and embodiments of the invention arise from the sub-claims and the description. Particularly preferred embodiments are explained in more detail with reference to the enclosed drawings. To avoid repetition, the method according to the invention is explained in more detail below together with the fish feed-in device according to the invention. The drawings show:

DETAILED DESCRIPTION OF THE INVENTION

Figure 1:
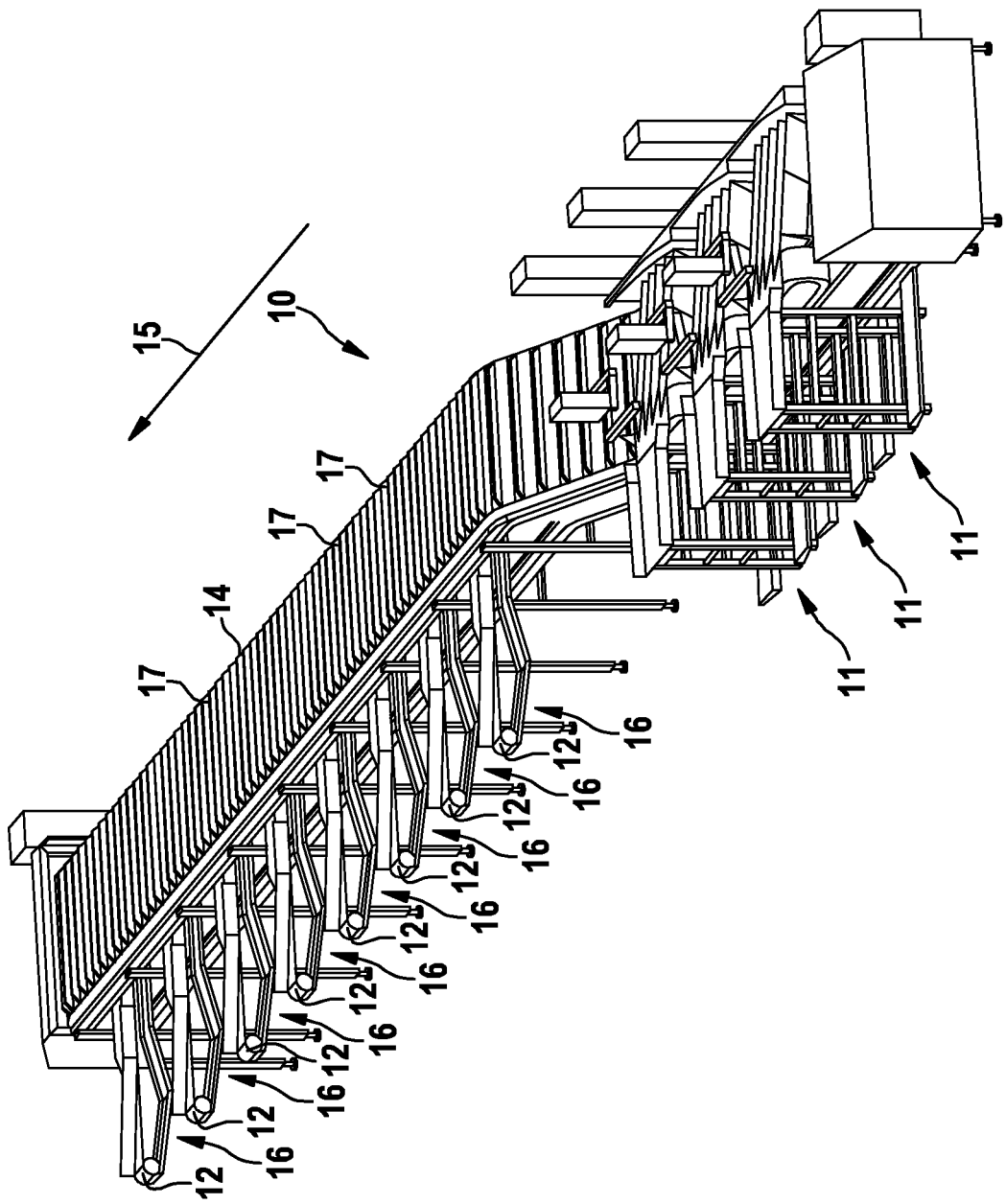
FIG. 1 shows a perspective view of an exemplary fish feed-in device according to the invention with three feeder devices and eight longitudinal conveyors.

FIG. 1 shows a perspective view of a fish feed-in device 10 according to the invention. As an example, the fish feed-in device 10 is configured with three feeder devices 11 and eight longitudinal conveyors 12. By way of the longitudinal conveyors 12, fish 13 (not shown in FIG. 1) are guided to several fish-processing devices. The fish-processing devices, for example slaughtering and/or gutting machines, are not shown in the drawing for reasons of clarity. The number of fish feed-in devices 10 shown, and the number of longitudinal conveyors 12, is evidently not restricted to the number shown in FIG. 1 but purely exemplary. As explained initially, one essential advantage of the present invention is that the number of feeder devices 11 and the number of longitudinal conveyors 12 and fish-processing machines connected thereto, may be configured arbitrarily according to application.

The fish feed-in device 10 according to the invention comprises a transverse conveyor 14 which is configured to convey the fish 13 transversely to their head-tail orientation in the transverse conveying direction 15. The head-tail orientation is based on a theoretical axis running from the head to the tail of the fish 13. The fish 13 are conveyed by way of the transverse conveyor 14 transversely to this axis in the transverse conveying direction 15. The transverse conveying direction 15 and said axis here form a right angle or approximately a right angle. The orientation of the fish 13, i.e. the direction in which the head of the fish 13 is pointing, is in principle arbitrary. Preferably however, the fish are oriented on the transverse conveyor 14 such that they are then conveyed tail first by way of the longitudinal conveyor 12.

Figure 2:
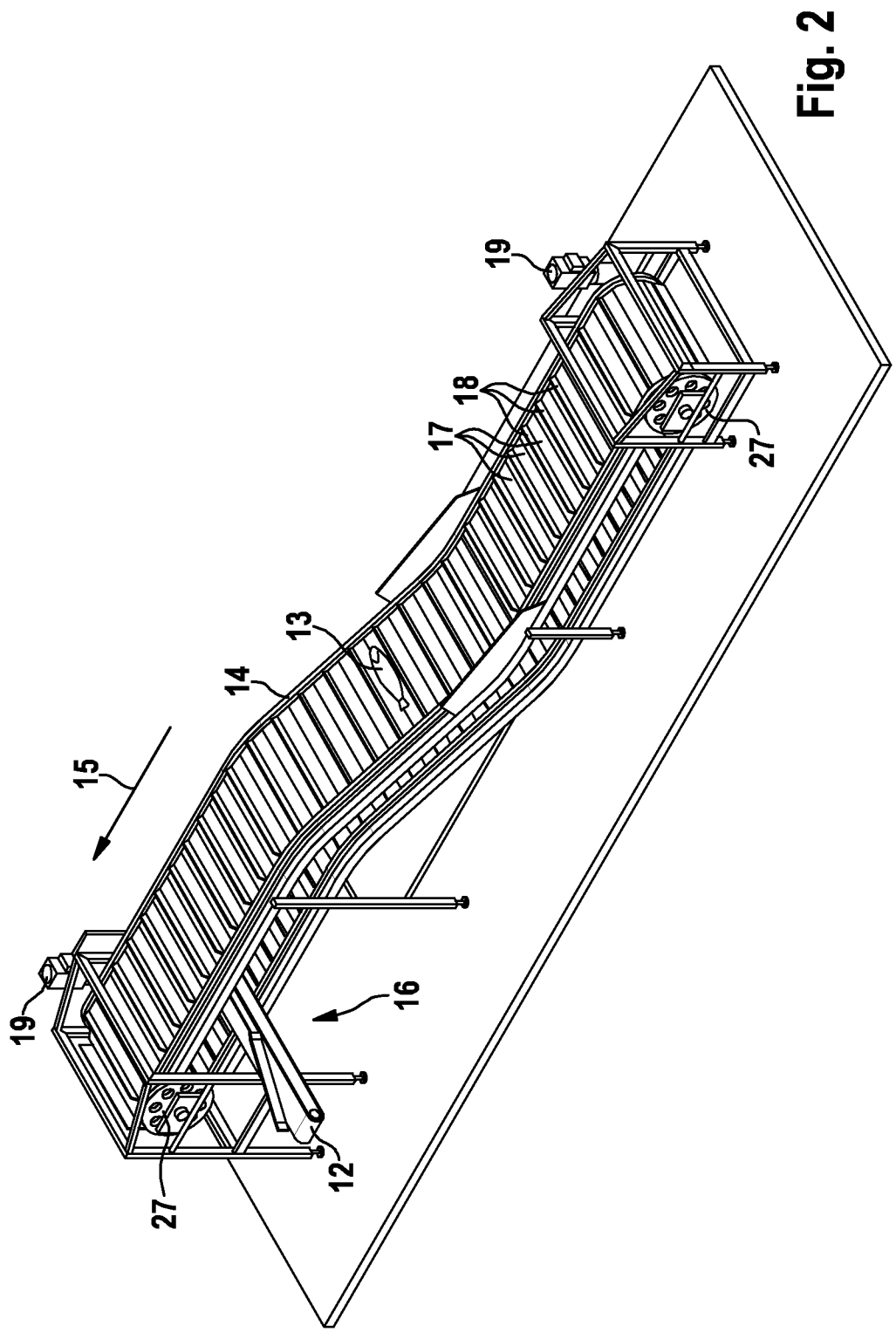
FIG. 2 shows a perspective view of the transverse conveyor according to the invention with a transfer device.
Figure 3:
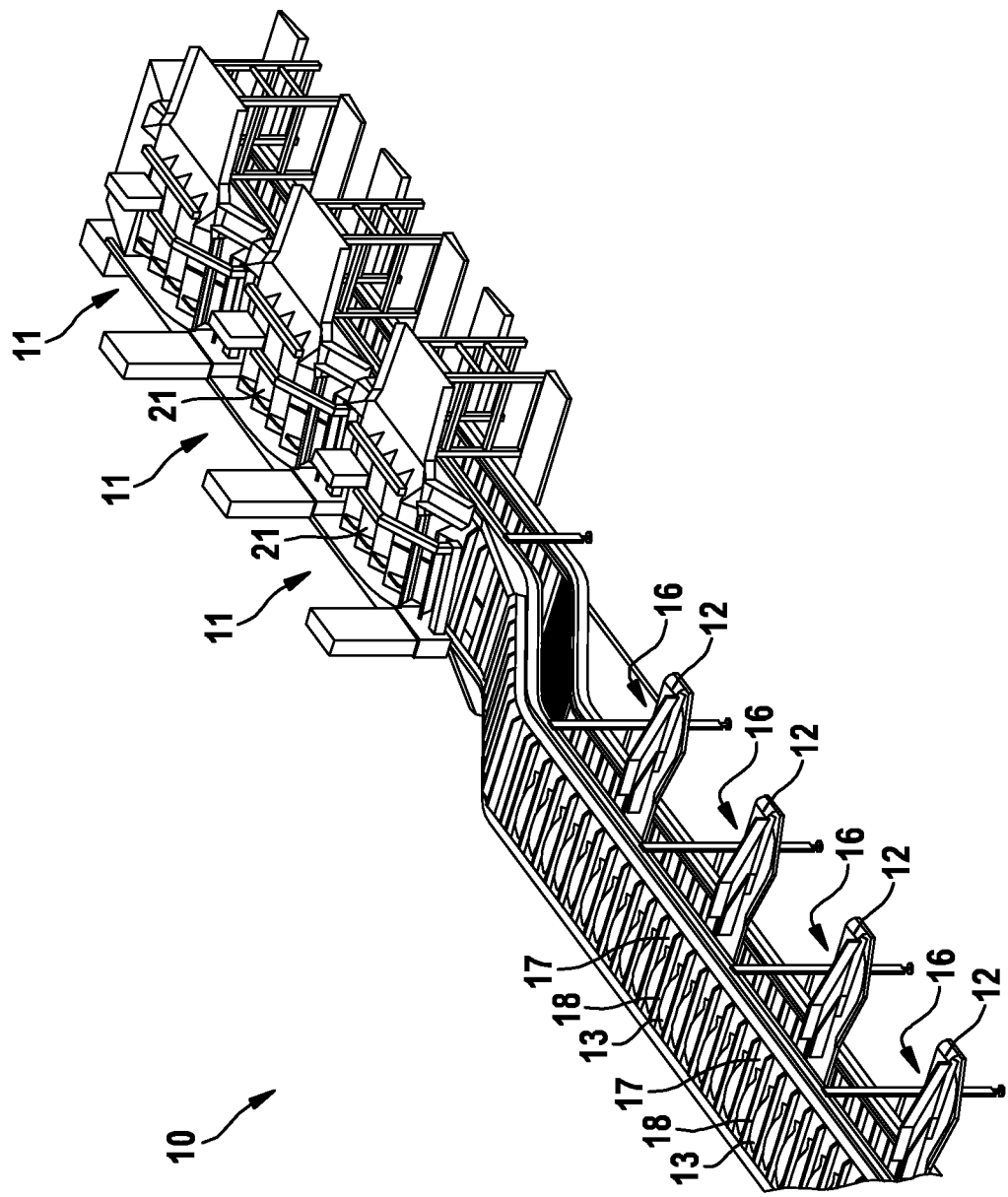
FIG. 3 shows a partial extract of the fish feed-in device shown in FIG. 1.

FIG. 2, which shows a perspective view of the transverse conveyor 14 according to the invention with just one transfer device 16, reveals that the transverse conveyor 14 comprises a plurality of receptacles 17 each configured to receive an individual fish 13. The length of the receptacles 17 is greater than the greatest length of the fish 13. Preferably, the receptacles 17 have edge elements 18 which protrude upward relative to the bottom of the receptacles 17, so that the fish 13 are conveyed securely by the receptacles 17 in the transverse conveying direction 15. Furthermore preferably, the bottom is formed inclined towards the middle of the receptacles 17, so that the fish 13 are automatically centred in the receptacles 17 under the effect of gravity. The transverse conveyor 14 has a drive unit 19 which is configured so as to be controllable and comprises for example one or more controllable servomotor drives.

As shown as an example in FIG. 1, the fish feed-in device 10 according to the invention comprises at least one feeder device 11 configured to supply fish 13 to the receptacles 17 of the transverse conveyor 14. The fish 13 are preferably transferred to the feeder devices 11 manually by operators, and said feeder devices 11 then fully automatically feed the fish 13 into the receptacles 17 of the transverse conveyor 14. The feed devices 11 and the receptacles 17 are configured such that each of the receptacles 17 can be supplied with one of the fish 13.

Furthermore, the fish feed-in device 10 according to the invention comprises several transfer devices 16 which are configured for selective transfer of the fish from the transverse conveyor 14 to the respective longitudinal conveyor 12 arranged upstream of the fish-processing devices.

By way of a control device (not shown in the drawing), the at least one feeder device 11, the transfer devices 16 and the conveying speed of the transverse conveyor 14 are controlled on the basis of at least one predefined distribution specification. In other words, the control device is designed and configured to control or regulate the above-mentioned components.

Figure 4:
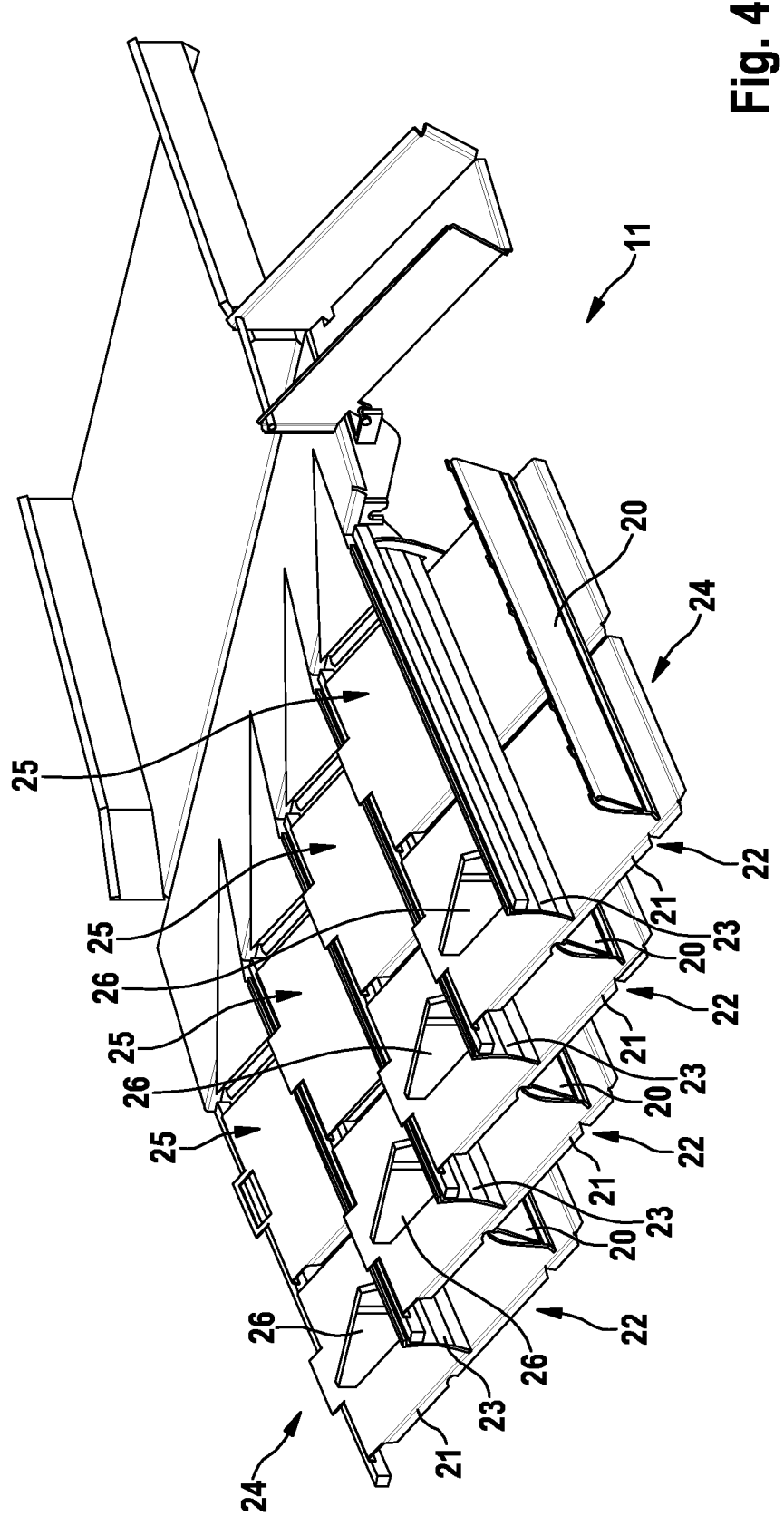
FIG. 4 shows an exemplary embodiment of one of the feeder devices in perspective view.

Preferably, the feeder device 11 shown as an example in FIG. 4 comprises at least one clocking flap element which is movable under control. This is configured to control, by way of a clocking control signal generated by the control device, the infeed of fish 13 to one of the receptacles 17 at a preselected output time. In other words, the control device is designed and configured such that one of the fish 13 is transferred to the respective receptacle 17 passing the clocking flap element 20 by way of the clocking flap element 20, insofar as the infeed of fish 13 is provided according to the predefined distribution specification, so that the receptacle 17 is supplied with one single one of the fish 13.

Advantageously, the feeder device 11 comprises a guide plane 21 which is arranged inclined such that under the effect of gravity, the fish 13 automatically come to lie in a first retaining area 22 in front of the clocking flap element 20 when the latter is in its closed position, and automatically move in the direction of the transverse conveyor 14 into the respective receptacle 17 when the clocking flap element 20 is in an open position. In FIG. 4, the clocking flap element 20 is shown in the closed position.

According to an advantageous development of the invention, the feeder device 11 comprises a storage flap element 23 which is movable under control. The storage flap element 23 together with the clocking flap element 20 forms a flap cascade 24. The fish 13 are brought via the guide plane 21 into a waiting area 25 in front of the storage flap element 23. When the storage flap element 23 is in an open position, the respective fish 13 moves under the effect of gravity into the first retaining area 22 and comes to rest in front of the clocking flap element 20 which is in the closed position, until this moves into the open position and the fish 13 enters the respective receptacle 17 as described above.

Advantageously, the control device is configured to control the flap cascade 24 such that when the clocking flap element 20 moves from the open position to the closed position, the storage flap element 23 moves from the closed position to the open position, and vice versa. The control device is consequently configured, in knowledge of the inertia behaviour of the fish 13, to take account of the delays occurring such that the opening process of the storage flap element 23 begins for example even while the clocking flap element 20 is still in the open position. It is however ensured that the clocking flap element 20 is already in the closed position or has already closed so far that the respective fish 13 comes to rest in the first retaining area 22. In this way, it is ensured that the fish 13 stops temporarily at least in the first retaining area 22.

According to a preferred embodiment of the invention, a sensor 26 for fish detection is arranged in the region of the storage flap element 23. The sensor is configured and designed to detect the presence of a fish 13 in the waiting area 25 in front of the storage flap element 23, and report this to the control device.

Advantageously, several of the feeder devices 11 are arranged next to and offset to each other in the transverse conveying direction 15 by at least a width of the receptacle 17. The number of feeder devices 11 arranged offset can be selected freely depending on need. As shown as an example in FIG. 4, the fish feed-in device 10 according to the invention may comprise four of the feeder devices 11. The feeder devices 11 are preferably arranged each offset by the width of a receptacle 17, so that successive receptacles 17 can be supplied without interruption.

The receptacles 17 of the transverse conveyor 14 preferably form a circulating conveyor. The receptacles 17 forming the transverse conveyor 14 are each guided via at least two drive wheels 27, each driven by the drive unit 19. Particularly preferably, each of the receptacles 17 is configured so as to be pivotable about a transverse axis 33. In other words, the receptacles 17 and the transverse conveyor 14 are configured such that the receptacles 17 can be tilted by way of the control device. Due to the oblique position of the receptacle 17, the fish 13 present in the respective receptacle 17 therefore slides out under the effect of gravity and is guided onto the respective longitudinal conveyor 12 in the region of the transfer devices 16.

Figure 5:
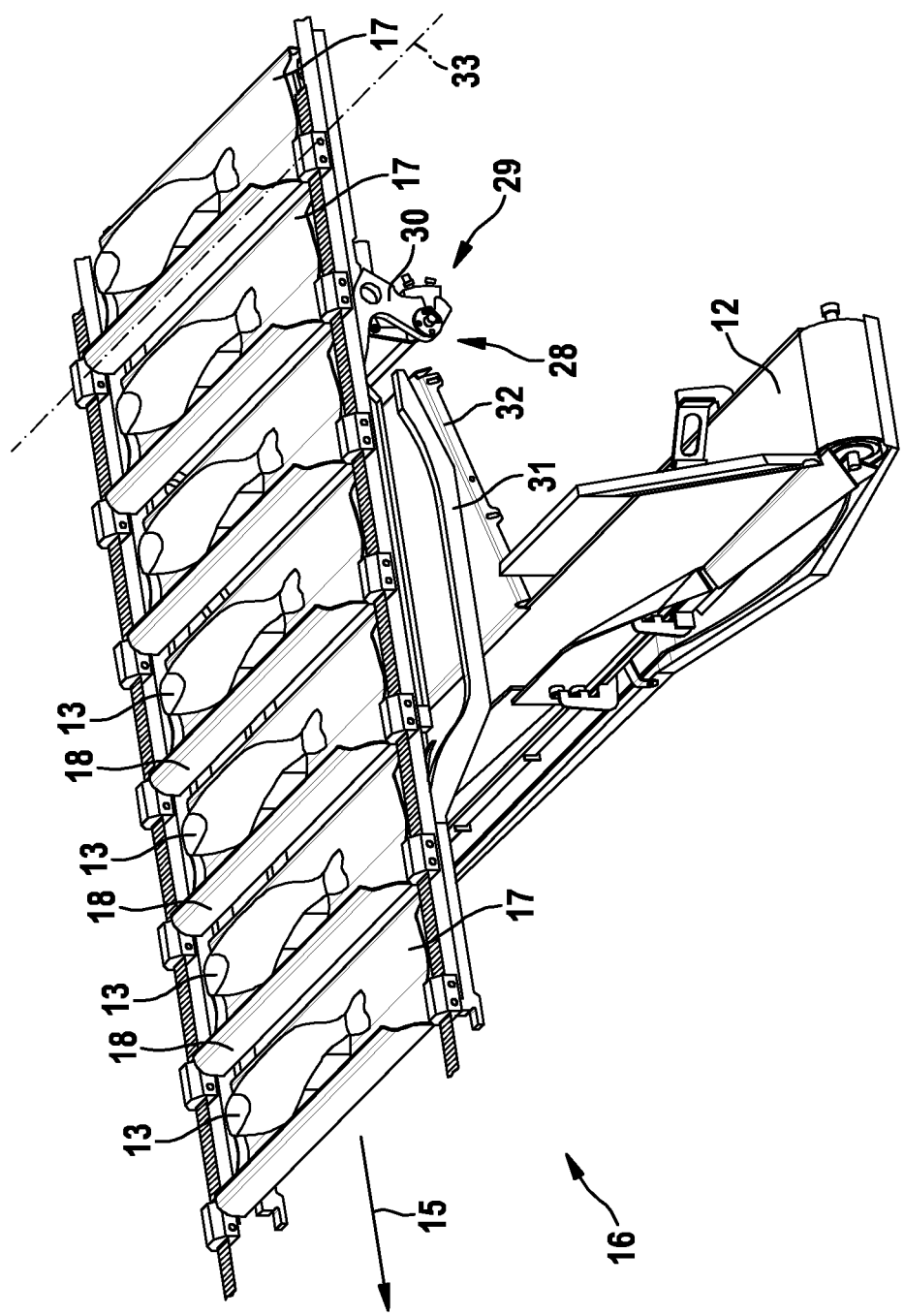
FIG. 5 shows a perspective, detail view of the transverse conveyor and a transfer device.

FIG. 5 shows in detail, in a perspective view, the transverse conveyor 14 and one of the transfer devices 16. The transfer devices 16 each comprise an ejecting diverter 28 which is designed and configured to pivot the respective receptacle 17 from a fish transport position into a fish ejection position by way of a transfer control signal generated by the control device. The fish ejection position corresponds to the oblique position described above of the respective receptacle 17, wherein the drawing only shows the fish transport position.

A preferred development is characterised in that the ejecting diverter 28 comprises a pivot guide 29 which is configured so as to be controllable by way of the transfer control signal. The pivot guide 29 comprises pivot elements 30. In the fish transport position, as shown in FIGS. 4 and 5, the pivot element 30 is oriented such that the receptacles 17 are guided in the transverse conveying direction 15. If the pivot element 30 is pivoted by way of the transfer control signal into a lower position (not shown in the drawing), the rear part of the receptacle 17 relative to the transverse conveying direction 15 is tilted about the transverse axis 33, in that the rear part of the receptacle 17 is guided via the pivot element 30 and the deflection guide 31 such that the respective receptacle 17 is brought into the fish ejection position.

Preferably, the transfer devices each comprise guiding device 32 in the region of the ejecting diverter 28, which device is configured to transfer the fish 13 from the receptacles 17 in the fish ejection position onto the respective longitudinal conveyor 12 under the effect of gravity.

Figure 6:
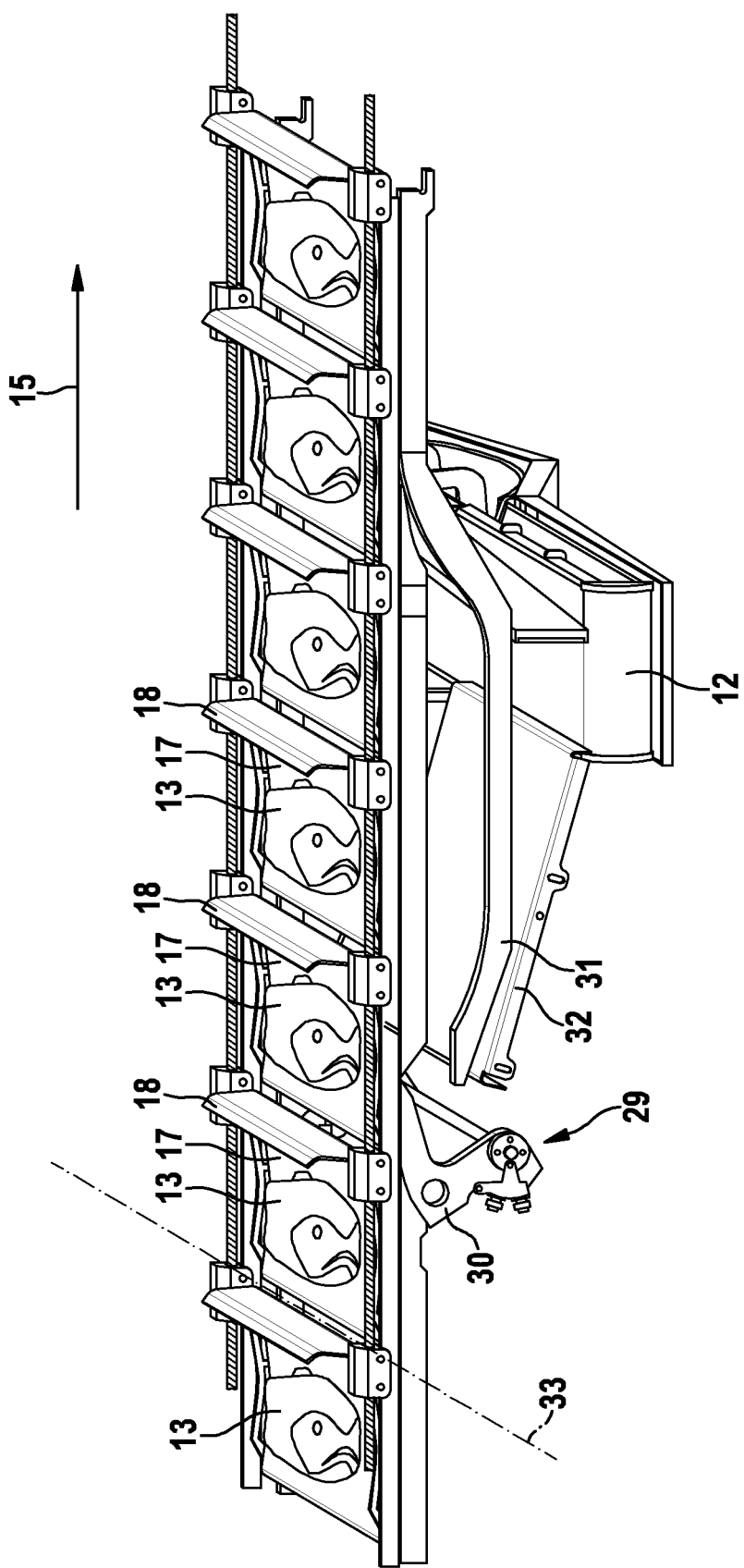
FIG. 6 shows the detail view shown in FIG. 5 from a rear perspective.
Figure 7:
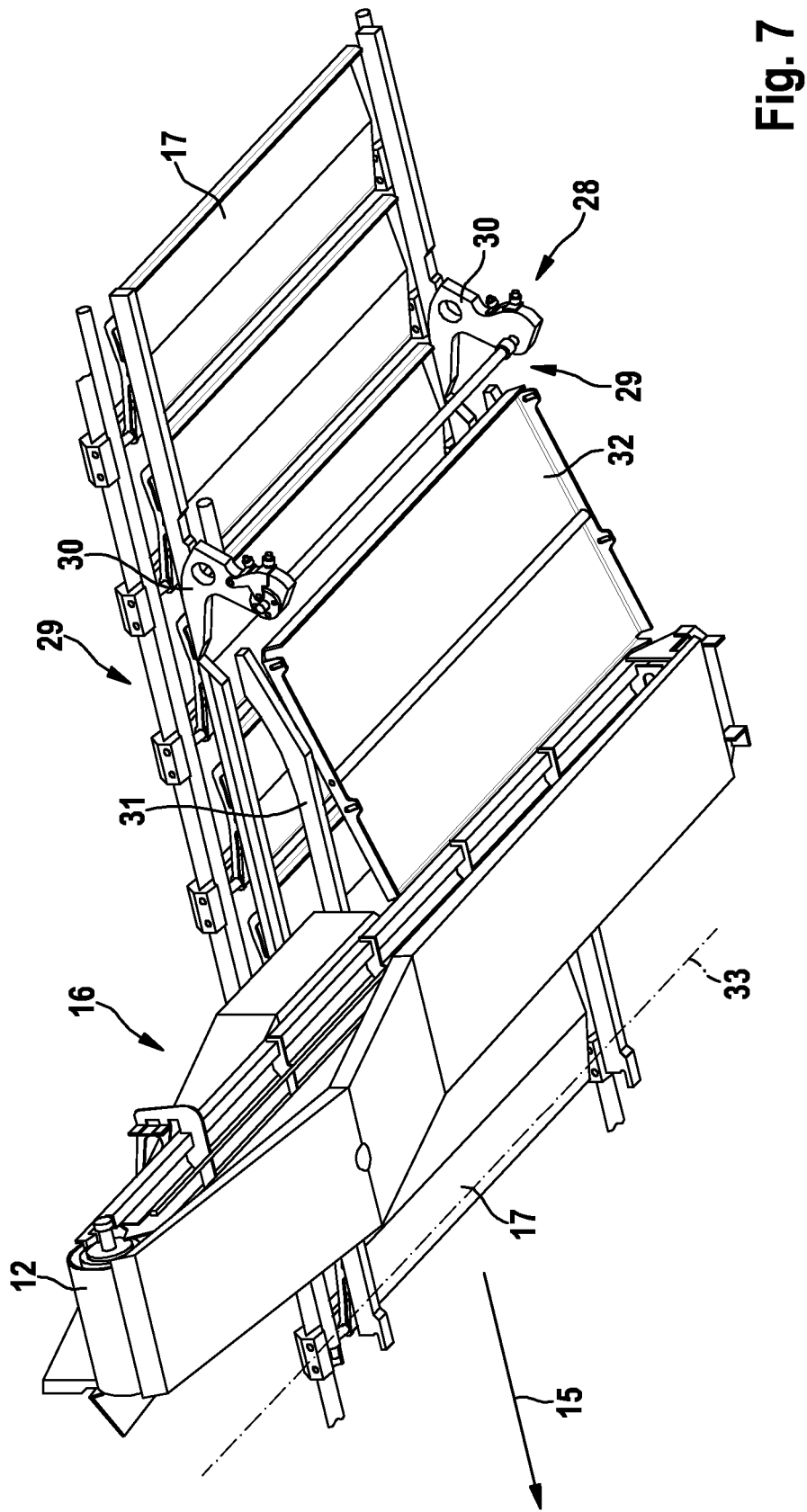
FIG. 7 shows the detail view shown in FIGS. 5 and 6 in a view from below.

FIGS. 6 and 7 also show the detail view shown in FIG. 5 from a rear perspective and in a view from below respectively.

According to a further advantageous embodiment of the invention, it is provided that the transfer devices 16 each comprise fish occupation sensors (not shown in the drawing). The fish occupation sensors are configured to report to the control device whether the respective longitudinal conveyor 12 is occupied by a fish 13 or is free in the region of the transfer device 16.

Preferably, the control device is configured, on the supply of fish 13 to the receptacle 17, to assign said receptacle 17 to one of the fish-processing machines on the basis of the predefined distribution specification, and to determine an allocation specification. Furthermore, the control device is in particular configured to determine the positions of the receptacles 17 and determine the respective output times on the basis of the allocation specification and the determined positions of the receptacles 17. The positions may be determined for example by a reference sensor which detects when a receptacle 17 passes a reference position. Since the control device is also configured to predefine and set the conveying speed of the transverse conveyor 14, it is furthermore preferably configured to determine the positions of the receptacles 17 on the basis of the position signals supplied by the reference sensor and the conveying speed.

Advantageously, the control device is configured to determine the take-up performance of the fish-processing machines and/or the occupation states of the transfer devices 16, and from this determine an actual take-up performance for each fish-processing device.

According to a further preferred embodiment of the invention, the control device comprises a comparison unit which is adapted to compare the actual take-up performance of each fish-processing device with a predefined nominal take-up performance assigned to the respective fish-processing device, and if at least one of the actual take-up performances falls below the respective assigned nominal take-up performance, to adapt the predefined distribution specification such that the respective nominal take-up performance is at least temporarily reduced.

Preferably, the control unit is furthermore configured to determine a total actual take-up performance as a sum of the actual take-up performances of the fish-processing machines, and to control the conveying speed of the transverse conveyor 14 such that the receptacles 17 are supplied without interruption.

The invention claimed is:

1. A fish feed-in device configured and designed to supply fish to fish-processing devices, said fish feed-in device comprising:
   a transverse conveyor configured to convey the fish along a conveying direction that is transverse to a head-tail orientation;
   said transverse conveyor comprising:
      a plurality of receptacles, with each receptacle being configured to individually hold one of the fish; and
      a controllable drive unit;
   at least one feeder device configured to supply fish to the plurality of receptacles of the transverse conveyor;
   a plurality of transfer devices, with each transfer device being configured to selectively transfer the fish from the transverse conveyor to one of a plurality of longitudinal conveyors arranged upstream of the respective fish-processing devices; and
   each of the plurality of longitudinal conveyors being configured to convey the fish in the head-tail orientation to the fish-processing devices, and
   a control device configured to control:
      the at least one feeder device;
      the plurality of transfer devices; and
      a conveying speed of the transverse conveyor on a basis of at least one predefined distribution specification.

2. The fish feed-in device of claim 1, wherein the at least one feeder device comprises at least one clocking flap element that is movable under a control of a clocking control signal generated by the control device, whereby an infeed of the fish to one of the receptacles at a preselected output time is controlled.

3. The fish feed-in device of claim 2, wherein the at least one feeder device comprises a guide plane that is inclined such that under an effect of gravity, the fish automatically come to lie in a first retaining area in front of the clocking flap element when the clocking flap element is in a closed position, whereby the fish automatically move in a direction of the transverse conveyor into the respective receptacle when said clocking flap element is in an open position.

4. The fish feed-in device of claim 3, wherein the at least one feeder device comprises a storage flap element that is movable under the control of the control device, said storage flap element being arranged upstream of the clocking flap element so as to constitute a flap cascade.

5. The fish feed-in device of claim 4, wherein the control device is configured to control the flap cascade such that when the clocking flap element is moved from the open position to the closed position, the storage flap element is configured to move from a closed position to an open position and vice versa.

6. The fish feed-in device of claim 5, further comprising:
   a fish detection sensor arranged in a region of the storage flap element and that is configured to detect a presence of a fish in a waiting area in front of the storage flap element and communicate with the control device.

7. The fish feed-in device of claim 1, wherein the at least one feeder device comprises plural feeder devices arranged next to and offset from each other in the conveying direction by at least a width of one of the plurality of receptacles.

8. The fish feed-in device of claim 1, wherein the transverse conveyor is a circulating conveyor.

9. The fish feed-in device of claim 1, wherein each of the plurality of receptacles is configured pivot about a transverse axis.

10. The fish feed-in device of claim 1, wherein each of the plurality of transfer devices comprises an ejecting diverter that is configured to pivot a respective receptacle from a fish transport position into a fish ejection position based on a transfer control signal generated by the control device.

11. The fish feed-in device of claim 10, wherein the ejecting diverter comprises a pivot guide that is controllable based on the transfer control signal.

12. The fish feed-in device of claim 10, wherein each of the plurality of transfer devices comprise a guiding device located in a region of the ejecting diverter, whereby the guiding device is configured to transfer the fish from the plurality of receptacles in the fish ejection position to a respective longitudinal conveyor under the effect of gravity.

13. The fish feed-in device of claim 1, wherein each of the plurality of transfer devices comprises a fish occupation sensor configured to communicate with the control device.

14. The fish feed-in device of claim 1, wherein the control device is configured to assign a respective one of the plurality of receptacles to a respective fish-processing device on a basis of the predefined distribution specification and to determine an allocation specification.

15. The fish feed-in device of claim 14, wherein the control device is configured to determine positions of the plurality of receptacles and determine respective output times on a basis of the allocation specification and the determined positions.

16. The fish feed-in device of claim 1, wherein the control device is configured to:
   determine a respective take-up performance of the fish-processing devices and/or an occupation state of each of the plurality of transfer devices; and
   determine an actual take-up performance for each of the fish-processing devices.

17. The fish feed-in device of claim 16, wherein the control device comprises a comparison unit adapted to compare the actual take-up performance with a predetermined nominal take-up performance assigned to the respective fish-processing device, and if at least one of the actual take-up performances falls below the respective assigned nominal take-up performance, to adapt the predefined distribution specification such that the respective nominal take-up performance is at least temporarily reduced.

18. The fish feed-in device of claim 16, wherein the control device is configured to determine a total actual take-up performance as a sum of the actual take-up performances and control the conveying speed of the transverse conveyor.

19. A method for supplying fish to fish-processing machines, comprising:
conveying the fish transversely to a head-tail orientation along a conveying direction, said fish being conveyed on a transverse conveyor comprising a plurality of receptacles which are each configured to individually hold one of the fish;
supplying the fish to the transverse conveyor utilizing at least one feeder device;
selectively transferring the fish, via a plurality of transfer devices, from the transverse conveyor to longitudinal conveyors arranged upstream of the fish-processing machines;
conveying of the transferred fish in a head-tail orientation to the fish-processing machines utilizing the longitudinal conveyors; and
controlling the supplying and the selectively transferring on a basis of at least one predefined distribution specification.

20. The method of claim 19, further comprising generating a clocking control signal with a control device and activating at least one clocking flap element of the at least one feeder device, whereby during the activating, the at least one clocking flap element moves and the fish are supplied at a preselected output time.

21. The method of claim 19, wherein the at least one feeder device comprises a guide plane that is inclined such that under an effect of gravity, the fish automatically come to lie in a first retaining area in front of the clocking flap element when the clocking flap element is in a closed position, whereby the fish automatically move in a direction of the transverse conveyor into the respective receptacle when said clocking flap element is in an open position.

22. The method of claim 19, wherein the at least one feeder device comprises a storage flap element that is movable under control of a control device, said storage flap element being arranged upstream of a clocking flap element so as to constitute a flap cascade.

23. The method of claim 19, wherein the controlling utilizes a control device configured to cyclically control a flap cascade of the at least one feeder device such that when a clocking flap element of the flap cascade is moved from an open position to a closed position, a storage flap element of the flap cascade is configured to move from a closed position to an open position and vice versa.

24. The method of claim 23, further comprising:
detecting, with a fish detection sensor arranged in a region of the storage flap element, a presence of a fish in a waiting area in front of the storage flap element and communicating with the control device.

25. The method of claim 19, wherein the at least one feeder device comprises plural feeder devices arranged next to and offset from each other in the conveying direction by at least a width of one of the plurality of receptacles.

26. The method of claim 19, wherein each of the plurality of receptacles is configured pivot about a transverse axis.

27. The method of claim 19, wherein each of the plurality of transfer devices comprises an ejecting diverter that is configured to pivot a respective receptacle from a fish transport position into a fish ejection position based on a transfer control signal generated by the control device.

28. The method of claim 27, wherein the ejecting diverter comprises a pivot guide that is controllable based on the transfer control signal.

29. The method of claim 27, wherein each of the plurality of transfer devices comprise a guiding device located in a region of the ejecting diverter, whereby the guiding device is configured to transfer the fish from the plurality of receptacles in the fish ejection position to a respective longitudinal conveyor under the effect of gravity.

30. The method of claim 27, wherein each of the plurality of transfer devices comprises a fish occupation sensor configured to communicate with the control device.

31. The method of claim 19, wherein the control device is configured to assign a respective one of the plurality of receptacles to a respective fish-processing machine on a basis of the predefined distribution specification and to determine an allocation specification.

32. The method of claim 19, wherein the transverse conveyor comprises a controllable drive unit and the controlling utilizes a control device to set a conveying speed of the transverse conveyor.

33. The method of claim 19, wherein the controlling utilizes a control device configured to:
determine a respective take-up performance of the fish-processing machines and/or an occupation state of each of the plurality of transfer devices; and
determine an actual take-up performance for each of the fish-processing devices.

34. The method of claim 33, wherein the control device comprises a comparison unit adapted to compare the actual take-up performance with a predetermined nominal take-up performance assigned to the respective fish-processing device, and if at least one of the actual take-up performances falls below the respective assigned nominal take-up performance, to adapt the predefined distribution specification such that the respective nominal take-up performance is at least temporarily reduced.

35. The method of claim 34, wherein the control device is configured to determine a total actual take-up performance as a sum of the actual take-up performances and control a conveying speed of the transverse conveyor.

* * * * *

UNITED STATES PATENT AND TRADEMARK OFFICE
CERTIFICATE OF CORRECTION

PATENT NO. : 10,588,323 B2
APPLICATION NO. : 16/096090
DATED : March 17, 2020
INVENTOR(S) : Jan-Patrick Herbst et al.

It is certified that error appears in the above-identified patent and that said Letters Patent is hereby corrected as shown below:

On the Title Page

Item (72) Inventors:
"(72) Inventors: Jan-Patrick Herbst, Gross Roennau (DE);
Frank Schubert, Hamburg (DE);
Ulf Jacobsen, Bad Schwartau (DE);
Christian Lohse, Hamburg (DE);
Ib Verner Dalgaard-Nielsen, Hoerning (DK)"

Should read:
--"(72) Inventors: Jan-Patrick Herbst, Groß Rönnau (DE);
Frank Schubert, Hamburg (DE);
Ulf Jacobsen, Bad Schwartau (DE);
Christian Lohse, Hamburg (DE);
Ib Verner Dalgaard-Nielsen, Hoerning (DK)"--

Signed and Sealed this
Eleventh Day of August, 2020

Andrei Iancu
*Director of the United States Patent and Trademark Office*